United States Patent [19]

Favreau et al.

[11] 4,073,586
[45] Feb. 14, 1978

[54] ARRANGEMENT FOR PROJECTING IMAGES OF MARKERS ON TO A PHOTOSENSITIVE SURFACE IN A TELECINE EQUIPMENT

[75] Inventors: Michel Favreau; Serge Vidal, both of Paris, France

[73] Assignee: Thomson-CSF, Paris, France

[21] Appl. No.: 687,630

[22] Filed: May 18, 1976

[30] Foreign Application Priority Data

May 23, 1975   France .................... 75 16066

[51] Int. Cl.² .................. G03B 27/76; G03B 27/78
[52] U.S. Cl. .................... 355/20; 250/549; 350/6.6; 355/41; 355/49; 356/167
[58] Field of Search .................. 355/47–49, 355/68, 20, 66, 8, 51, 41; 250/203 CT, 549; 350/7; 356/167; 358/132, 199, 204, 206–292, 302

[56] References Cited

U.S. PATENT DOCUMENTS

| 2,718,549 | 9/1955 | Mattke .................... 358/132 |
| 3,149,235 | 9/1964 | Clark .................... 250/203 CT |
| 3,154,371 | 10/1964 | Johnson .................... 358/132 X |
| 3,567,852 | 3/1971 | Ett .................... 250/549 X |
| 3,751,584 | 8/1973 | Pickering et al. .................... 355/20 X |
| 3,752,558 | 8/1973 | Lloyd .................... 355/41 X |
| 3,917,955 | 11/1975 | Inuiya .................... 250/549 |

*Primary Examiner*—Richard A. Wintercorn
*Attorney, Agent, or Firm*—Cushman, Darby & Cushman

[57] ABSTRACT

In a telecine equipment of the flying spot cathode-ray tube type with an oscillatory mirror, markers associated with the frames of a film are illuminated with a light spot of small dimensions, which substantially follows the motion of the marker associated with the frame being scanned. This is obtained by means of a small fixed light source, which is used for scanning the path followed by the marker associated with the film frame being scanned, using the same optical channel as for the frame scanning. This same optical channel, used in the reverse direction by means of a fixed mirror located behind the film, forms the image of the illuminated marker.

3 Claims, 1 Drawing Figure

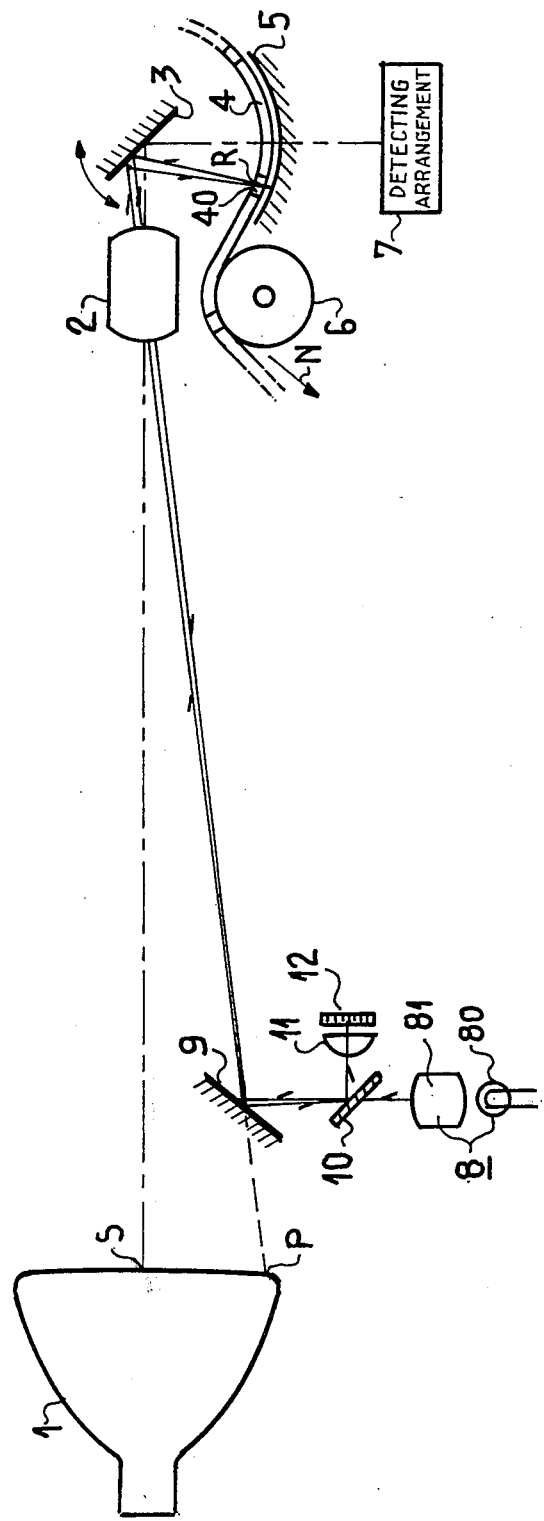

ARRANGEMENT FOR PROJECTING IMAGES OF MARKERS ON TO A PHOTOSENSITIVE SURFACE IN A TELECINE EQUIPMENT

The present invention relates to an arrangement for projecting onto a photosensitive surface images of markers associated with the frames of a film, and more particularly to such arrangements, as used, for controlling the vertical scanning of the film frames in telecine equipment wherein the scanning is effected by means of a flying spot cathode ray tube and an oscillating mirror.

Arrangements of this type are known in which an optical system gives an image of the marker, generally a perforation in the film, upon the screen of the tube or in its immediate neighbourhood, the optical path defined by this optical system being the reverse of that followed by the light from the tube spot in carrying out field-scanning of the film frames. This image of the marker will only be stable if the whole optical and mechanical system of the telecine equipment operates correctly; it is well-known, using photodiodes for example, to measure the interval between the effective position of the image of the marker and the theoretical correct position, and to use a voltage resulting from this measurement in order to correct the movement of the oscillatory mirror or the centring of the scanning raster of the telecine tube.

In the known arrangements, the light-source illuminating the marker projects a large light area on to the whole surface swept by a marker during the time for which the frame with which it is associated is being scanned. This gives rise to major difficulties on the one hand in achieving uniform illumination of the marker by the light source, and on the other hand as a consequence of the parasitic light which such arrangements direct on to the photosensitive detector of the telecine equipment receiving the light signals resulting from the scanning of the film, the parasite light thus interfering with those useful light signals.

The object of the invention is to overcome these defects.

This result is achieved by illuminating the markers with a light spot of small dimensions, which substantially follows the motion of the frame being scanned.

In accordance with the invention, there is provided in a telecine equipment comprising a flying spot cathode-ray tube, an objective lens, and an oscillatory mirror for scanning films comprising frames and markers associated in a one to one relationship with said frames, an arrangement for projecting on to a photosensitive surface an image of the marker associated with the frame being scanned, said arrangement comprising first means for illuminating the marker associated with the frame being scanned, and second means for forming on to said photosensitive surface an image of the illuminated marker, said first means comprising a fixed light source, and an optical channel, including said objective lens and said oscillatory mirror, for forming an image of said fixed light source on the marker associated with the frame being scanned.

The drawing shows in part a telecine with a projecting arrangement according to the invention. The flying spot S, of a cathode ray tube 1 forms a scanning raster on the screen of the tube. By means of an objective lens 2 and an oscillatory mirror 3, an image of this raster is formed on a film 4 sliding over a curved track 5 whose centre coincides with the axis of rotation of the oscillatory mirror 3. The part of the oscillatory mirror is to allow the image of the scanning raster on the film to have the same movement as the latter for the duration of the analysis of each frame, an abrupt return of the mirror to its initial position separating the analysis of two consecutive frames.

The curved track 5 comprises two sections which engage the film only at its edges in order to enable the light from the spot S and marked by a straight broken line, to reach a detecting arrangement 7 placed behind the curved track 5.

The film displaces with a continuous motion whose direction is indicated by an arrow N, under the control of a mechanical device a roller 6 of which has been shown in the drawing.

The film 4 comprises markers which are associated in a one to one relationship, with its frames; in the case of the drawing, these markers are formed by perforations in the film.

The telecine equipment also comprises a substantially point light source 8 formed by means of a lamp 80 and an optical unit 81. A fixed mirror 9 forms a virtual image of this source, which is located on the screen of the tube 1, at the point P where the flying spot should be (in absence of mirror 9) for illuminating the marker through the optical channel 2–3.

Thus, an image R of the source 8 is formed which illuminates the perforation 40, following the latter's motion, this perforation forming the marker associated with the frame being scanned.

That part of the curved track 5 which supports the film 4 at the location of the perforations, comprises a curved mirror so arranged that the perforations pass above and at a short distance from the mirror in order to avoid any risk of scratching it. Thus, after the outgoing optical path between the source 8 and the curved mirror, the light is reflected by the latter; part of the light then follows an optical return path which brings it to a bank of photodiodes 12; this return path is the reverse of the outgoing one with the difference that a semi-reflecting, semi-transparent splitting mirror 10 is arranged between the source 8 and the mirror 9 in order to deflect part of the light energy following said return path, on to the bank of photodiodes 12 illustrated in much exaggerated fashion in the drawing since in reality its size is less than a millimetre. A cylindrical lens 11, arranged in front of the bank of photodiodes, concentrates the light from the source 8, reflected by the curved mirror.

The electronic circuits processing the signals delivered by the photodiodes have not been shown since circuits of this kind are well-known to those skilled in the art and their description would not further the understanding of the invention.

The splitting mirror 10, besides giving an image of the marker outside the light source 8, makes it possible to avoid any possible parasitic effect of the source 8 on the bank of photodiodes 12.

The image R which takes the form of a light spot, must have a sufficiently large area to ensure that despite possible errors in the positioning of the film, it is always on the perforation associated with the frame being scanned, or more precisely upon the leading edge of said perforation because in telecine equipment of the considered type, it is normally this edge which does duty as reference. These positional errors are of very small amplitude and, in practice, the dimension of the light spot is of the order of the dimension of the perforation.

Of course, the invention is not limited to the embodiment described and shown which was given solely by way of example.

What is claimed is:

1. In a telecine equipment comprising a flying spot cathode-ray tube, an objective lens, and an oscillatory mirror for scanning films comprising frames and markers associated in a one to one relationship with said frames, an arrangement for projecting on to a photosensitive surface an image of the marker associated with the frame being scanned, said arrangement comprising first means for illuminating the marker associated with the frame being scanned, and second means for forming on said photosensitive surface an image of the illuminated marker, said first means comprising a fixed light source, and an optical channel, including said objective lens and said oscillatory mirror, for forming an image of said fixed light source on the marker associated with the frame being scanned.

2. An arrangement as claimed in claim 1, wherein said optical channel further comprises a fixed mirror arranged between said source and said objective lens for forming a virtual image of the fixed light source on the cathode-ray tube, said fixed mirror also forming part of said second means.

3. An arrangement as claimed in claim 1, wherein said second means comprises: said optical channel; a further mirror located behind the path followed by the marker associated with the frame being scanned, for reflecting the rays from said light source towards said optical channel; and a splitting mirror located between said fixed light source and said optical channel for optically coupling said photosensitive surface to said optical channel.

* * * * *